United States Patent [19]
Lavash

[11] 3,779,007
[45] Dec. 18, 1973

[54] FUEL DELIVERY AND CONTROL SYSTEM FOR A GAS TURBINE ENGINE

[75] Inventor: John Paul Lavash, Cincinnati, Ohio

[73] Assignee: General Electric Company, Lynn, Mass.

[22] Filed: Apr. 28, 1972

[21] Appl. No.: 248,694

[52] U.S. Cl. ............... 60/39.28 R, 60/241, 60/243, 60/39.66
[51] Int. Cl. ............................................. F02c 9/10
[58] Field of Search ...................... 60/39.28, 39.66, 60/241

[56] References Cited
UNITED STATES PATENTS

| | | | |
|---|---|---|---|
| 3,627,239 | 12/1971 | Hull | 60/39.28 R |
| 3,307,355 | 3/1967 | Bahr | 60/39.28 R |
| 3,434,395 | 3/1969 | Londal | 60/39.28 R |
| 3,566,900 | 3/1971 | Black | 60/39.28 R |
| 2,865,580 | 12/1958 | Marshall | 60/39.66 UX |
| 2,925,712 | 2/1960 | Johnson | 60/39.66 X |
| 2,979,293 | 4/1961 | Mount | 60/39.66 X |
| 3,080,716 | 3/1963 | Cummings | 60/39.66 |
| 3,238,719 | 3/1966 | Harslem | 60/39.66 X |
| 3,420,055 | 1/1969 | Lavash | 60/39.28 R |

Primary Examiner—Clarence R. Gordon
Attorney—Derek P. Lawrence et al.

[57] ABSTRACT

A fuel delivery and control system is provided for use with a gas turbine engine and includes a fuel-oil heat exchanger for reducing engine oil temperature wherein a minimum rate of fuel flow is maintained through the heat exchanger and main fuel control by including a second recirculating valve in parallel flow connection to the fuel control metering valve. The recirculating valve is arranged to automatically open and close as a function of fuel temperature, metering valve position and in-flight engine fuel shutoff.

5 Claims, 2 Drawing Figures

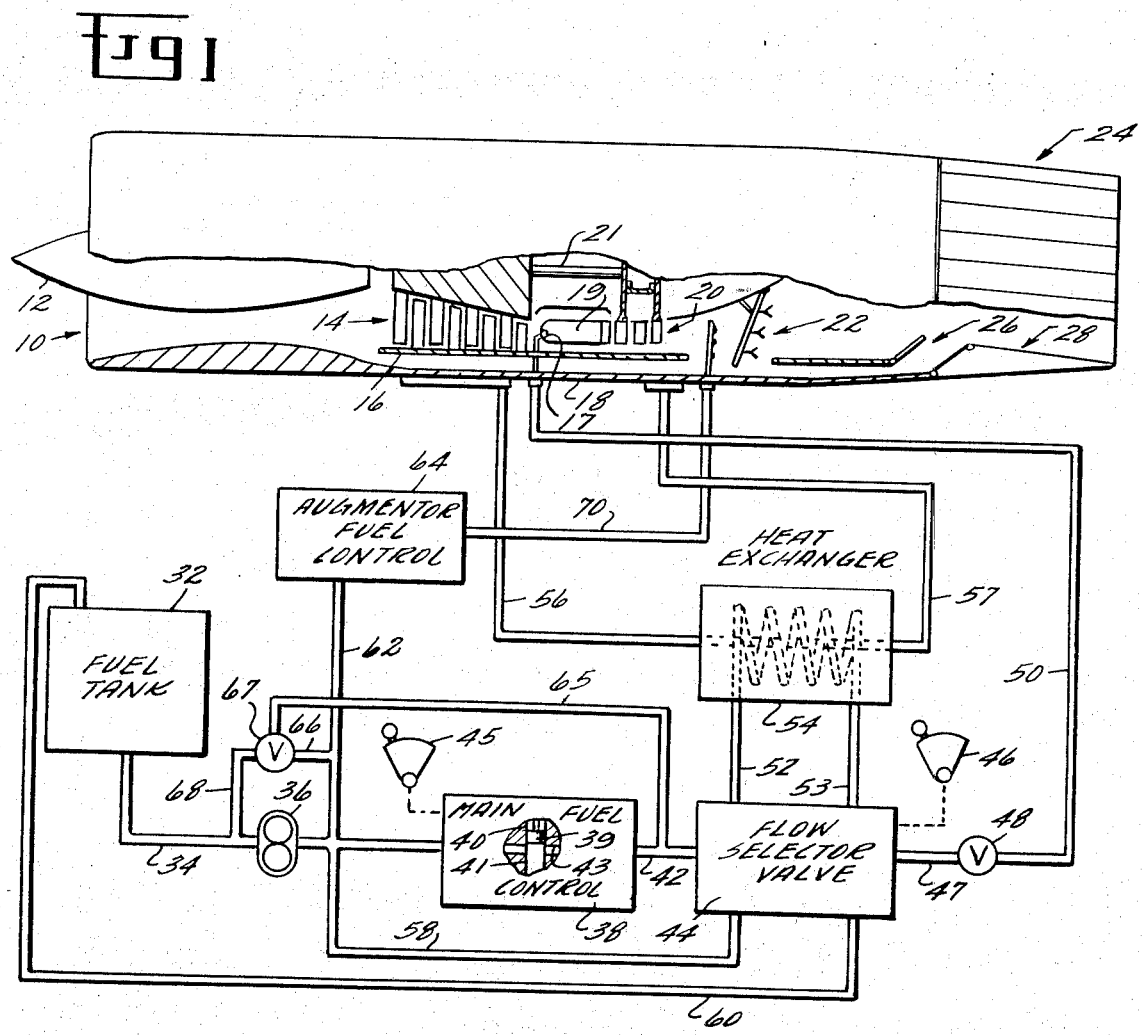
PRIOR ART

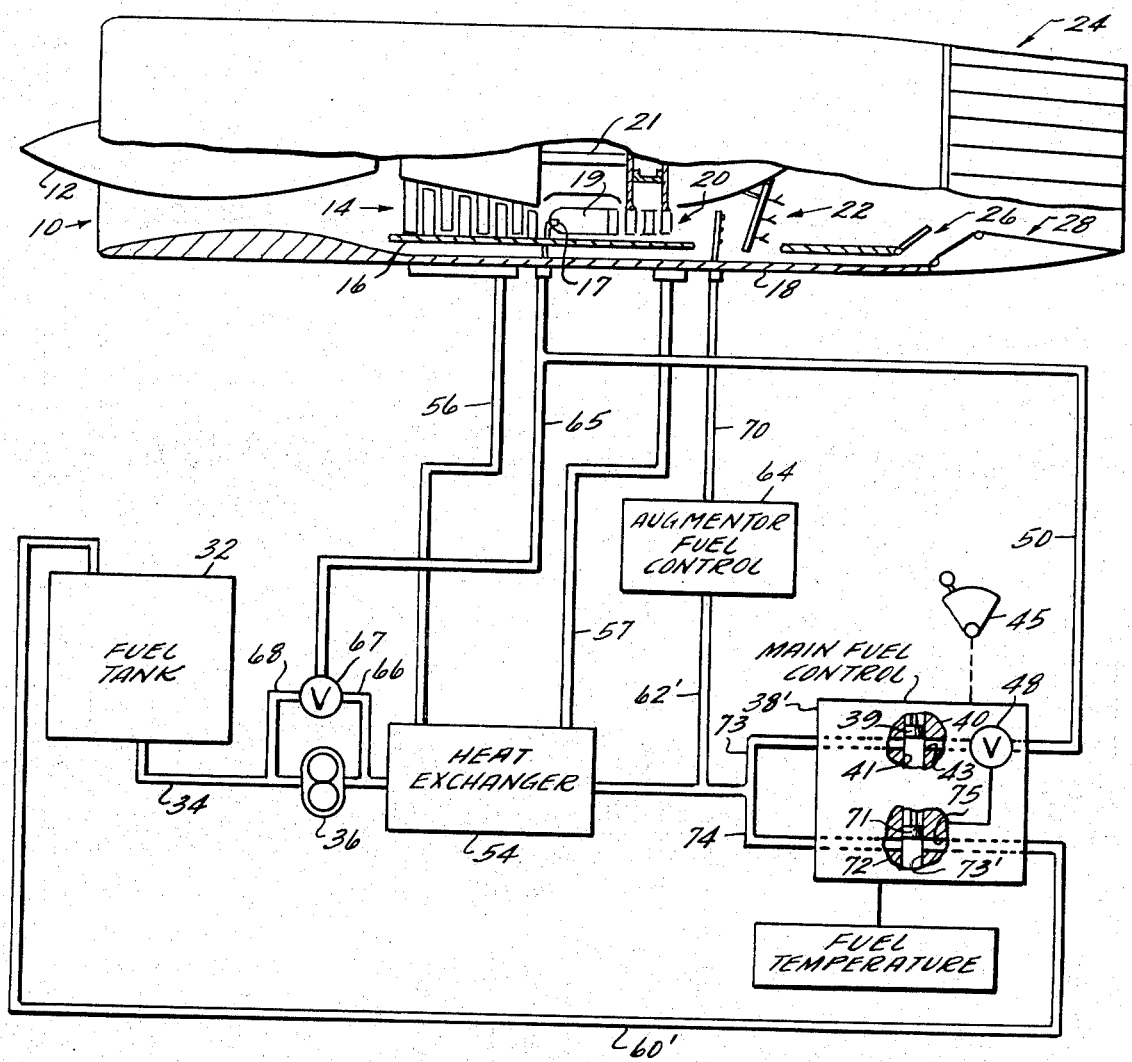

3,779,007

FUEL DELIVERY AND CONTROL SYSTEM FOR A GAS TURBINE ENGINE

BACKGROUND OF THE INVENTION

This invention relates to a fuel delivery and control system for a gas turbine engine and more particularly to a fuel delivery and control system having the additional capability of providing a minimum rate of fuel through a fuel-oil heat exchanger for automatically maintaining an adequate rate of heat exchange independent of flight mission requirements.

The invention described and claimed herein resulted from work done under United States Government contract FA-SS-66-6. The United States Government has an irrevocable, non-exclusive license to practice and have practiced the invention claimed herein, including the unlimited rights to sub-license others to practice and have practiced the claimed invention for any purpose whatsoever.

The next generation of military and commercial gas turbine engines having supersonic capability will be required to meet an array of requirements and standards of expectancy for the fuel system and power controls more complex than ever before experienced. The supersonic transport era will introduce to commerical transport the use of augmentation burning in combination with operation at Mach. 2.7 thermal conditions further complicating the already complex cooling difficulties of supersonic gas turbine engines.

Fuel delivery and control systems for such modern supersonic gas turbine engines generally comprise a fuel pump driven by the rotor of the engine, which pressurizes a source of fuel for delivery to a fuel control. The fuel control includes a metering valve for scheduling the flow of fuel to a series of fuel nozzles for injection into a combustor as a function of a number of control inputs. A fuel-oil heat exchanger is generally included downstream of the fuel control to cool hot engine oil while preheating fuel delivered to the fuel nozzles.

One of the characteristics of this type of system is that as fuel flow through the metering valve increases, there will be an increase in back pressure. Since the increase in pressure output of the fuel pump does not necessarily follow the increase in back pressure of the metering valve, the pump is sized to produce an excess output for all but the maximum flow requirements of the metering valve. The pressure output of the pump is then controlled to match the back pressure variations of the nozzles by a pressure regulating bypass valve which throttles the excess pump overflow to a low pressure point, usually the pump inlet. This throttling action generates a heat input to the fuel which is generally dependent on the pressure drop and flow across the bypass valve.

When the fuel is used to cool hot engine oil, as through a fuel-oil heat exchanger, this addition of heat to the fuel may become a problem. A specific example is found in an engine which powers an aircraft executing an idle descent at supersonic speeds. During this maneuver, the rotational speed of the engine is high due to windmilling of the engine rotor, thus causing the pump output to be nearly maximum. At the same time, the flow through the metering valve is minimal. As a result an excessive amount of fuel is throttled from the relatively high pressure outlet of the pump to its inlet, thereby adding a substantial amount of heat which impairs the ability of the fuel to act as a cooling medium for the hot engine oil.

One suggested solution, as disclosed in U.S. Pat. No. 3,420,055 to this inventor and of common assignment, involves the use of a complex flow selector valve which can be actuated by the pilot to disconnect the metered fuel flow from the heat exchanger when such fuel flow decreases to a sufficiently low rate. The valve simultaneously introduces a recirculation fuel flow directly from the fuel pump into the heat exchanger. The recirculation fuel maintains a high rate of flow regardless of the metered fuel rate, and therefore acts to reduce the amount of fuel throttled from the high pressure outlet of the fuel pump to its inlet so as to cause a corresponding reduction in the amount of heat added to the fuel. Whereas the recirculation fuel originates from the fuel pump and bypasses the metering valve of the fuel control, it is maintained at a substantially high rate of flow and can be substituted for the metered fuel flow to provide a suitable cooling flow to the oil-fuel heat exchanger. The primary disadvantage to such a system, however, is that the flow selector valve must be actuated by the pilot, who must in turn monitor the rate of metered fuel flow to the main engine combustor. This additional task for the pilot to perform only operates to further complicate an already complex pilot control mission further increasing the chance of a pilot error which could cause an overheating of the engine oil. Overheated engine oil in turn accelerates engine wear and can lead to premature engine failure.

Therefore, it is an object of this invention to provide a simplified fuel delivery and control system wherein an adequate cool flow of fuel can be automatically delivered to the fuel-oil heat exchanger independently of the metered fuel flow rate.

It is a further object of this invention to provide a fuel delivery and control system for a supersonic gas turbine engine wherein a minimum rate of fuel is assured through a fuel-oil heat exchanger for automatically maintaining an adequate rate of heat exchange independently of flight mission requirements.

SUMMARY OF THE INVENTION

To this end a fuel delivery and control system is provided for a gas turbine engine. The system includes a fuel reservoir in flow communication with a fuel pump, the purpose of which is to draw and pressurize fuel from the reservoir. A heat exchanger is provided in flow communication with the fuel pump and receives fuel therefrom. The heat exchanger also receives hot oil from the gas turbine engine and circulates the hot engine oil in heat exchanging relation with the fuel whereupon the cooled oil is then returned to the engine. A fuel control is provided in downstream flow communication with the heat exchanger for receiving heated fuel therefrom. The control includes a metering valve for scheduling the rate of fuel flow to the engine. A recirculating valve is also included in flow communication with the metering valve inlet for scheduling and increasing rate of fuel flow therethrough as a function of increasing fuel temperature, thereby maintaining a minimum rate of fuel flow to the fuel control. Means are also included for directing the fuel discharged from the recirculating valve back to the fuel reservoir.

BRIEF DESCRIPTION OF THE DRAWINGS

The invention may be better understood upon read-

3 ing the following description of the preferred embodiment in conjunction with the accompanying drawings:

FIG. 1 is a schematic view showing a conventional fuel delivery and control system in combination with a gas turbine engine having supersonic capability.

FIG. 2 is a schematic view showing the fuel delivery and control system of this invention in combination with the gas turbine engine of FIG. 1.

DESCRIPTION OF THE PREFERRED EMBODIMENT

Referring to FIG. 1, there is shown a conventional fuel delivery and control system for use with a supersonic gas turbine engine. The supersonic gas turbine includes an inlet 10 within which is disposed an axisymmetrical spike 12. The majority of the air is further pressurized by a compressor 14. A small percentage of the air bypasses the compressor as "secondary air" flowing through the space between the engine compressor casing 16 and an outer casing or pod 18. The air pressurized by the compressor 14 supports combustion of fuel in a combustor 19 in the generation of a hot gas stream. Fuel is introduced into the combustor through a series of fuel nozzles 17. A portion of the energy of this hot gas stream drives a turbine 20 which is connected to the rotor of the compressor 14 by a shaft 21. The hot gas stream discharged from the turbine 20 may be augmented by the combustion of additional fuel in an afterburner 22. The hot gas stream (motive fluid stream) is then discharged through a propulsion nozzle 24 which comprises a convergent, primary nozzle 26 and a divergent, secondary nozzle 28. The gas turbine engine with supersonic capability so far described is conventional and well known to the art.

In the prior art fuel delivery and control system of FIG. 1, a fuel tank 32 supplies gas turbine engine fuel to a main fuel pump 36 by way of conduit 34. The fuel pump 36 is driven by the rotor of the engine. A portion of the fuel exiting from the fuel pump 36 is directed to a main fuel control 38 which includes a metering valve 40 for scheduling the flow of fuel to the engine combustor. A portion of the fuel from the main fuel pump is also directed to the afterburners 22 through an augmentor fuel control 64, and communicating conduits 62 and 70. The metering valve 40 comprises a piston 39 displaceable in a bore 41. The piston 39 cooperates with an outlet port 43 to form a variable area orifice for passage of fuel from the metering valve to a conduit 42.

A pressure regulating bypass valve 67 is adapted to bypass pressurized fuel from conduit 62 through conduits 66 and 68 to the inlet of pump 36 whenever the pressure upstream of the metering valve is greater than a predetermined pressure level above the pressure downstream of the metering valve as sensed through a conduit 65. Thus a constant pressure differential is maintained across the metering valve 40 which causes the flow metered thereby to be directly proportional to the area of the orifice formed by the piston 39 and the outlet port 43. The piston 39 is controlled primarily as a function of the position of a pilot control lever 45. Additional control inputs reflecting selected engine operating parameters such as speed, temperature and pressure are fed to the fuel control 38 for control of the metering valve piston 39 so that the flow to the engine provides optimum engine performance.

Metered fuel flow exiting from the main fuel control by way of conduit 42 is directed to a flow selector valve 44 which, under relatively high fuel flows as encountered during engine acceleration, directs the cool metered fuel flow through conduit 52 to a fuel-oil heat exchanger 54. The fuel-oil heat exchanger 54 receives hot oil from the hot oil conduit 56 of the engine and discharges cool oil through a communicating conduit 57 back to the engine. Cool metered fuel flows through the fuel-oil heat exchanger 54 in heat exchange relation with the oil whereupon the heated fuel discharges through conduit 53 back to the flow selector valve 44. The heated fuel again flows from the flow selector valve 44 through a conduit 47 to a combined cutoff and pressurizing valve 48 which maintains the fuel pressure above a predetermined minimum value. The cutoff and pressurizing valve 48, which may be pilot actuated by means not shown, further provides for positive fuel shutoff during engine shutdown. The fuel nozzles 17 receive heated fuel from the cutoff and pressurizing valve by way of conduit 50.

These are certain operating conditions under which the amount of fuel bypassed through the bypass valve 67 would be excessive thus generating substantial heat input to the fuel. Specifically this condition can arise when an aircraft which is powered by the engine is executing a descent with a minimum thrust output after high speed flight. During this condition, the rotational speed of the engine is at a maximum because of the pumping effect of the air on the compressor while the fuel flow required to sustain combustion is at a relatively low level. Since the flow output of the fuel pump 36 is nearly maximum and the flow required by the nozzles 17 is at a minimum, the amount of fuel bypassed would be substantial thus introducing a substantial heat input to the fuel. In order to compensate for a low metered fuel rate and a high bypass rate, recirculation fuel is provided to the fuel-oil heat exchanger 54 by way of conduit 58 in cooperation with the flow selector valve 44. The sudden introduction of recirculation fuel acts to reduce the amount of fuel bypassed thereby lowering the heat input to the fuel. During low metered flow rates, the flow selector valve 44 must be switched by a pilot controlled lever 46 so that the high flow rate of recirculation fuel from conduit 58 is directed into the fuel-oil heat exchanger 54. The heat exchanger rate is maintained at an efficient level by the high rate of flow of cool recirculation fuel through the heat exchanger while the metered fuel flow passes directly through the flow selector valve from conduit 42 to conduit 47. The heated recirculation fuel discharges from the fuel-oil heat exchanger 54 through conduit 53 from whence the flow selector valve 44 directs the heated circulation fuel back to the fuel tank by way of conduit 60.

Thus, it will be appreciated that the prior art fuel delivery and control system has the attendant disadvantage of being capable of only directing either metered fuel flow or recirculation fuel flow through the heat exchanger, and that the recirculation and metered fuel flows cannot be commingled in order to achieve a modulated system.

It will also be appreciated that the flow selector valve must be controlled by the aircraft pilot who is then further burdened by having to monitor a fuel flow meter or indicator in order to determine the precise moment at which to actuate the flow selector valve.

Referring now to FIG. 2, where like numerals designate previously described elements, there is shown the fuel delivery and control system of this invention which provides for the automatic introduction of a recirculation fuel through the heat exchanger, thereby simplifying operation of the aircraft and eliminating the chance of pilot error. In the fuel delivery and control system of this invention, a fuel tank 32 supplies gas turbine engine fuel to a main fuel pump 36 by way of conduit 34. All of the fuel to be supplied to the gas turbine combustor 19 and afterburners 22 is then directed through the fuel-oil heat exchanger 54. As previously described, the fuel-oil heat exchanger 54 receives hot oil from the hot oil conduit 56 of the engine and discharges cool oil through a communicating conduit 57 back to the engine. Cool fuel flows through the fuel-oil heat exchanger 54 in the heat exchange relation with the oil whereupon the heated fuel discharges to the main fuel control 38' by way of the diverging conduits 73 and 74.

The main fuel control 38' includes a metering valve 40 for scheduling the flow of heated fuel to the engine combustor and a recirculating valve 72 for controlling the rate of return of heated recirculation fuel back to the fuel tank 32. The metering valve 40 is conventional comprising piston 39 displaceable in bore 41 and cooperating with the outlet port 43 to form a variable area orifice for passage of fuel from the metering valve to a conduit. The piston 39 is controlled primarily as a function of the position of the pilot control lever 45. Additional control inputs reflecting selected engine operating parameters such as speed, temperature and pressure are fed to the fuel control 38 for control of the metering valve piston 39 so that the flow to the engine provides optimum engine performance. The pressure regulating bypass valve 67 operates in the manner previously described.

Heated fuel from the metering valve 40 is then directed through a cutoff and pressurizing valve 48 which may be pilot actuated by means not shown in order to provide for positive fuel shutoff during engine shutdown. The fuel nozzles 17 receive heated fuel from the cutoff and pressurizing valve 48 by way of conduit 50 and the afterburners 22 receive heated fuel from the augmentor fuel control 64 by way of communicating conduits 62' and 70.

The recirculating valve 72, like the metering valve, includes a piston 71 displaceable in a bore 73'. The piston 71 cooperates with an outlet port 75 to form a variable area orifice for passage of fuel from the recirculating valve through conduit 60' back to the fuel tank. The recirculating valve 72 is adapted to operate in a manner which maintains a minimum rate of fuel flow through the heat exchanger and main fuel control independently of the engine operating conditions. Opening and closing of the recirculating valve 72 is controlled as a function of fuel temperature with the recirculating valve opening to provide an increased flow of fuel through the heat exchanger when the temperature of the fuel reaches a predetermined maximum value. The metering valve is interconnected with the recirculating valve such that an opening of the metering valve will override opening of the recirculating valve, thereby insuring an accurate metered fuel flow rate regardless of the position demanded of the recirculating valve.

In the event of an in-flight engine shutdown, fuel to the combustor 19 would be shut off by pilot actuation of the cutoff valve 48. During this condition, the rotational speed of the engine rotor would continue to be high because of the wind-milling effect of the air on the compressor while at the same instant the fuel flow would be entirely stopped by the cutoff valve 48. Therefore, it becomes necessary to provide an additional control input from the cutoff valve 48 to the recirculation valve 72 so as to automatically open the recirculating valve to maintain cooling fuel flow through the heat exchanger upon actuation of the cutoff valve. Otherwise engine oil would overheat and damage the bearings eventually seizing the engine rotor upon an in-flight shutdown.

Thus it will be appreciated that by dividing the flow of fuel through the main fuel control 38' and by regulating the divided flow by means of the metering valve 40 and recirculating valve 72, a minimum rate of fuel flow can be maintained through both the main fuel control and heat exchanger independent of the flight mission fuel requirements. Should the flight mission demand a reduced quantity of metered fuel flow as during descent from supersonic cruise, the recirculating valve would automatically open as a function of increasing fuel temperature thereby maintaining a minimum rate of fuel flow through the heat exchanger. The rate of the fuel flow through the bypass valve would also remain below a predetermined maximum rate due to the opening of the recirculation valve.

It would be further appreciated that by maintaining a minimum flow rate through the heat exchanger and main fuel control combined with stationing the heat exchanger 54 upstream of the fuel control serves to automatically maintain an adequate rate of cooling flow irrespective of the flight mission requirements. A further increase in heat exchange efficiency is accomplished by connecting the augmentor fuel control 64 downstream of the heat exchanger 54 in order that the afterburner fuel also be directed to absorb heat from the hot engine oil. The simplified fuel delivery and control system of this invention provides a failsafe means by which recirculation fuel may be commingled with engine fuel in order to achieve a modulated cooling system the operation of which is fully independent of pilot error.

Thus having described a preferred embodiment of the invention, though not exhaustive of all possible equivalents, what is desired to be secured by letters patent is claimed below.

What is claimed is:

1. A fuel delivery and control system for a gas turbine engine comprising:
a fuel reservoir;
a pump communicating with the fuel reservoir for drawing fuel therefrom;
a heat exchanger communicating with the fuel pump for receipt of fuel therefrom, and further communicating with the gas turbine engine for receipt of hot engine oil therefrom wherein the hot engine oil is maintained in heat exchange relation with the fuel and then returned to the engine at a cooler temperature;
a fuel control in downstream flow communication with the heat exchanger for receiving heated fuel therefrom and including a metering valve for scheduling the rate of fuel flow to the engine and a recirculating valve communicating with the metering valve inlet for scheduling an increasing rate of fuel flow therethrough as a function of increasing fuel temperature thereby maintaining a minimum rate of fuel flow to the fuel control; and
means for directing the fuel discharged from the recirculating valve back to the fuel reservoir.

2. The fuel delivery and control system of claim 1, wherein:
the gas turbine engine is of the type having a supersonic capability and includes a thrust augmenting afterburner,
and wherein the system further includes an augmentor fuel control in downstream flow communication with the heat exchanger for receiving a portion of the heated fuel therefrom and scheculing the flow of fuel to the afterburners according to engine mission requirements.

3. The fuel delivery and control system of claim 1 including:
bypassing means adapted to bypass pressurized fuel from the pump outlet to the pump inlet whenever the pressure upstream of the metering valve is greater than a predetermined pressure level above the pressure downstream of the metering valve, and
a cutoff and pressurizing valve in serial flow relation to the metered fuel flow for maintaining the fuel pressure above a minimum value and providing for positive fuel shutoff during engine shutdown and including means for increasing the rate of flow through the recirculating valve upon complete fuel shutoff.

4. The fuel delivery and control system of claim 1 wherein the metering valve is cooperatively coupled with the recirculating valve such that an opening of the metering valve will override opening of the recirculating valve, thereby insuring an accurate metered fuel flow rate regardless of the position demanded of the recirculating valve.

5. The fuel delivery and control system of claim 4 wherein:
the metering valve includes a first piston displaceable in a first bore and cooperating with a first outlet port therethrough to form a first variable area orifice for the passage of fuel, wherein the piston is primarily controlled as a function of the position of a pilot control lever with additional control inputs reflecting selected engine operating parameters, and
the recirculating valve includes a second piston displaceable in a second bore and cooperating with a second outlet port therethrough to form a second variable area orifice for the passage of fuel.

* * * * *